Feb. 14, 1967   H. H. WIESE   3,303,981
POSITIONING APPARATUS FOR INTERMITTENTLY
OPERATED STRIP FILM PROJECTOR
Filed Jan. 19, 1965
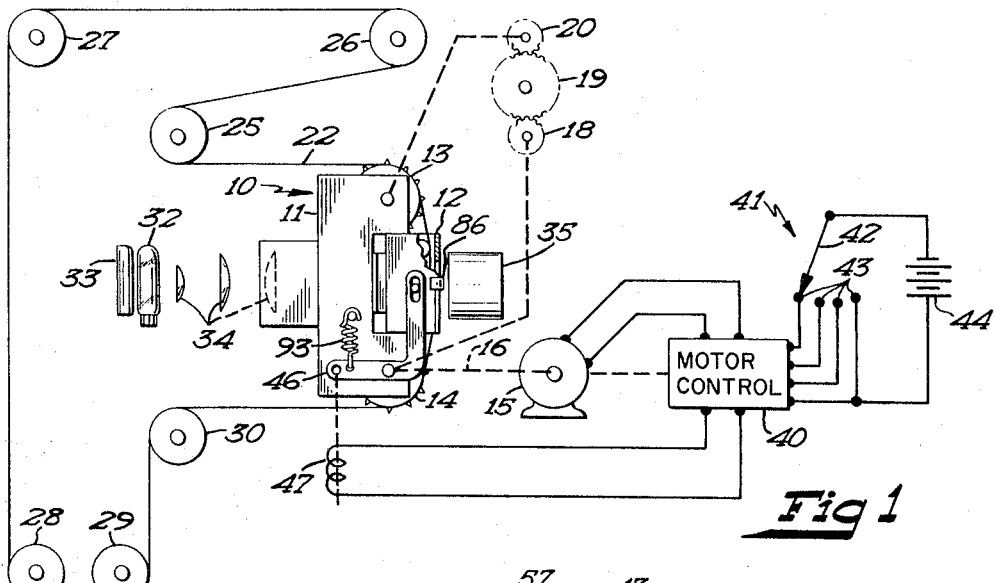
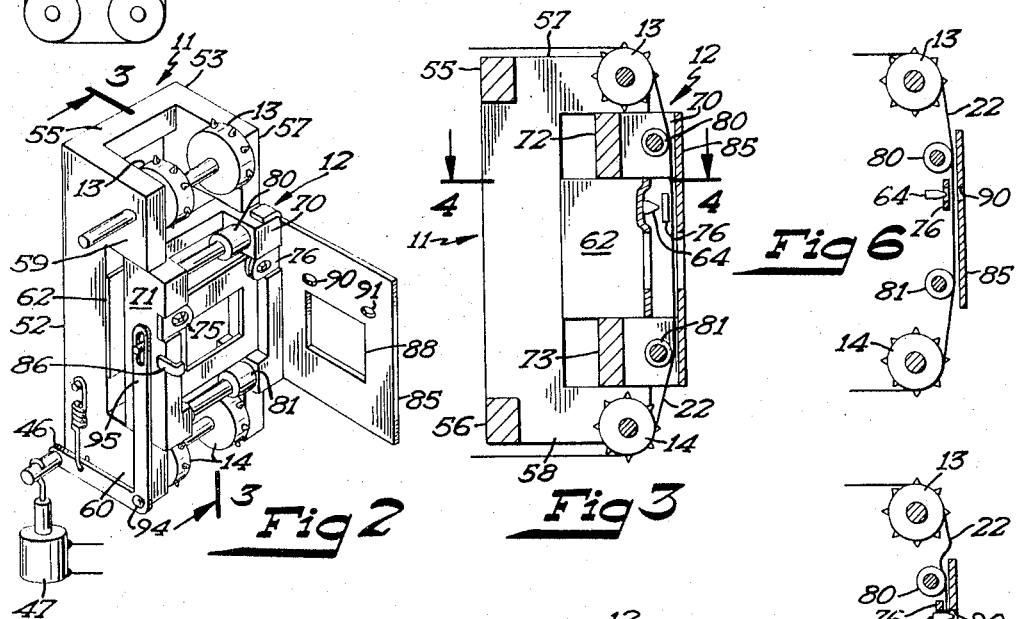
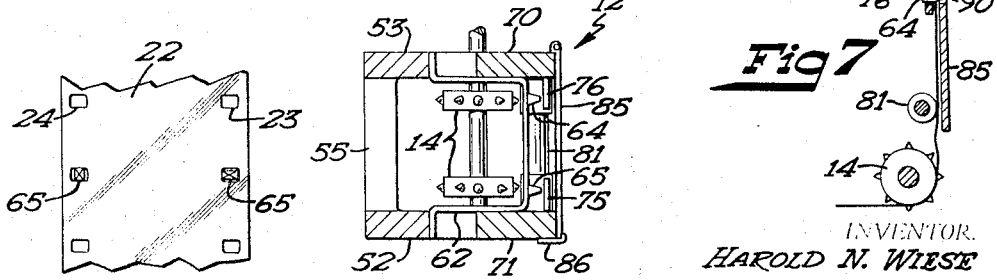
INVENTOR.
HAROLD N. WIESE
BY Frederick E. Lange
ATTORNEY United States Patent Office 3,303,981
Patented Feb. 14, 1967

3,303,981
POSITIONING APPARATUS FOR INTERMITTENTLY OPERATED STRIP FILM PROJECTOR
Harold H. Wiese, Davenport, Iowa, assignor to Mast Development Company, Davenport, Iowa, a corporation of Iowa
Filed Jan. 19, 1965, Ser. No. 426,586
9 Claims. (Cl. 226—56)

The present invention is concerned with a film positioning apparatus and more particularly with one employed in a strip film projector in which the film is run continuously until a desired portion of the film is reached and the film is then stopped and accurately positioned.

The invention is particularly concerned with the type of apparatus in which it is desired to select any one of a large number of pieces of information recorded on a strip film and to bring the selected portion of the film rapidly and accurately to viewing position. The object of this invention is to provide an arrangement for accurately and firmly positioning the film in the selected position without damage to the film.

Broadly, I accomplish this by providing locating projecting portions which are normally out of the path of the film as it is being continuously driven to the desired spot with means for changing the relative positions of the film and the projecting portions so that the projecting portions enter apertures in the film which are normally used for driving the same. More specifically, I provide a guiding means which is normally maintained in a position with respect to the film in which the film is placed under slight tension. When it is desired to stop the film and accurately position it, the position of the guiding means with respect to the film is shifted so that the film has a certain amount of slack introduced therein. This enables the projecting positioning members to shift the film somewhat if it is necessary for the projecting portions to do so to enter the apertures in the film. In this way, the film can be very accurately positioned without any damage thereto.

Further objects of the invention will be apparent from a consideration of the accompanying specification, claims and drawing of which:

FIGURE 1 is a schematic view of a projector employing my film positioning apparatus;

FIGURE 2 is a perspective view, with portions shown schematically, of my film positioning apparatus;

FIGURE 3 is a sectional view, taken along the line 3—3 of FIGURE 2;

FIGURE 4 is a sectional view, taken along the line 4—4 of FIGURE 3;

FIGURE 5 is a view showing how the film locating pins enter the apertures in the film to position the same both laterally and horizontally;

FIGURE 6 is a schematic view showing the relative positions of the film guiding means, film locating members and the film when the film is being continuously driven; and FIGURE 7 is a similar view to that of FIGURE 5 but with the film guiding means and the film locating means being in the relative positions they assume when the film is positioned in the desired location.

Referring specifically to FIGURE 1 of the drawing, I have shown a projector employing my improved film positioning apparatus in somewhat schematic form. The film positioning portion of my apparatus is indicated in its entirety by the reference numeral 10. This portion comprises a fixed frame member 11 and a movable frame member 12. The fixed frame member 11 has mounted thereon two pairs 13 and 14 of sprocket wheels which are driven by a motor 15 through any suitable transmission means 16. The sprocket wheels 14 are shown as being directly driven by motor 15 and sprocket wheels 13 may be connected thereto by any suitable gearing arrangement. For purposes of illustration, I have shown the sprocket wheels 14 as operatively connected to a gear 18 which is connected through an idler gear 19 to a gear 20 which, in turn, is connected to the sprocket wheels 13. The particular manner of interconnecting the sprocket wheels 13 and 14, is not, however, a significant feature of my invention and any suitable means for doing so may be employed.

The movable member 12 of my film positioning apparatus has means for guiding a film 22 as it passes through the projection area. The film as shown in FIGURE 4 is of a conventional type having a series of sprocket holes 23 adjacent one longitudinal edge of the film and a similar series of sprocket holes 24 adjacent the other longitudinal edge of the film. These sprocket holes 23 and 24 are shown as having the conventional rectangular shape but sprocket holes of various shapes might be employed consistent with the spirit of the invention. The film is shown in FIGURE 1 in the form of an endless loop which passes over a series of idler rollers 25, 26, 27, 28, 29 and 30.

While the particular manner in which the image on the film is projected forms no part of my invention, I have shown schematically a projection lamp 32, a reflector 33, condensing lens elements 34, and a projection lamp 35. It will be understood that the light from lamp 32 is concentrated by the reflector 33 and projected through the condensing lens arrangement 34 and through the portion of the film being viewed. The image is magnified by the projection lens 35 and may be projected onto any suitable viewing surface.

Motor 15 is controlled by a motor control 40 which may be of the type which can run the motor 15 continuously to a preselected position and then stop the motor accurately at the preselected position. I have shown a switch mechanism 41, which is schematically shown as comprising a movable switch member 42 and a plurality of contacts 43, for controlling the motor control unit 40. Interposed between the motor control 40 and switching mechanism 41 is a suitable source of power 44 which, purely for convenience, has been shown as a battery. The selector switching mechanism 41, while shown as a simple switch movable between a plurality of contacts, can in actual practice consist of a number of rotary or keyboard decade switches, one for each order of digits in the total count base. Thus, if the possible film positions to be selected are under a hundred, two digital switches would be used, and if the number of possible film positions is over a hundred, three such switches would be used. Each of these switches would have a plurality of possible positions corresponding to the number of possible digits in the order of digits with which it is associated.

In general, the switch mechanism 41 and the motor control 40 is effective to drive the motor 15 rapidly to a position preselected by the switch mechanism 41 and to stop the film 22 accurately at the selected position. A typical motor positioning system of this type which positions the film rapidly to any one of a large number of preselected positions is that shown in the application of Wright K. Gannett, Serial No. 320,697, filed November 1, 1963, for Digitalizer and Digital Servomechanism.

As will be apparent from the subsequent description, I provide means for effecting relative movement of members 11 and 12 of my film positioning apparatus 10 when the film is being stopped. In this connection, I employ a bell crank lever 46 which is positioned by a solenoid 47 connected to the motor control 40. Whenever the motor control is effective to stop motor 15, it is simultaneously effective to energize the solenoid 47. As will be pointed out later, the energization of solenoid 47 is effective through the positioning of the bell crank lever 46 to move the film guiding member 12 inwardly with respect to the fixed frame member 11.

Referring now to FIGURES 2 and 3, it will be noted that the frame member 11 is channel shaped, having two side walls 52 and 53 which are interconnected by cross bars 55 and 56. The two side walls 52 and 53 have their center portions partially cut away to provide two parallel arms. These arms in the case of side member 53 have been designated by the reference numerals 57 and 58 and in the case of side member 52 by the reference numerals 59 and 60. The other frame member 12 which, as previously noted, acts to guide the film, is slidably supported in the channels provided between the upper arms 57 and 59 and the lower arms 58 and 60. The two sprocket wheels 13 are journaled in the upper arms 57 and 59 and the two sprocket wheels 14 are mounted on a shaft journaled in the lower arms 58 and 60. The two shafts carrying the sprocket wheels 13 and 14 are interconnected with each other by some means such as that schematically shown in FIGURE 1 and briefly described and the sprocket wheels 13 or 14 may be operatively connected to a suitable motor, as also schematically shown in FIGURE 1. Since the manner in which the sprocket wheels 13 and 14 are driven forms no part of the present invention, these details have not been shown in connection with FIGURES 2 and 3.

A U-shaped bracket member 62 is secured to the two side walls 52 and 53 of the frame member 55 centrally thereof so as to be located between the upper arms 57 and 59 and the lower arms 58 and 60. The two side walls of the U-shaped bracket 62 are spaced apart to provide the guide for the film guiding member 12 as probably best shown in FIGURE 4. The front wall of this U-shaped member 62 is provided with a plurality of film locating projecting members in the form of pins 64 and 65. These pins 64 and 65 are designed to enter selected ones of the apertures 23 and 24, respectively.

As best indicated in FIGURE 5, the pin 64 has a tapered front portion but at its base is the full width of a slot 23. The pin may be slightly narrower at its base than a typical slot 23. The pin 65, on the other hand, is elongated in the direction of travel of the film 22 so that when it is fully inserted into one of the slots 24, it engages the upper and lower edges of the slot firmly. In other words, the base of the pin 64 has the exact width of one of the slots 23 whereas the base of the pin 65 has the exact height of one of the slots 24. When pins 64 and 65 thus enter the slots, the film is accurately positioned in a horizontal direction by the pin 65 while it is accurately positioned in the transverse direction by the pin 64.

As best shown in FIGURE 3, the pins 64 and 65 are located in slightly recessed portions of the front wall of the bracket 62. The purpose of this recessed portion will be referred to later.

Referring now to the movable frame member 12, this comprises two side walls 70 and 71 which are joined by two cross arms 72 and 73. As best shown in FIGURES 2 and 4, a stripper finger 75 is secured to the front portion of the side wall 71 of movable member 12 and a corresponding stripper finger 76 is secured to the side wall 70. These stripper fingers 75 and 76 are so located that their front surfaces are recessed slightly from the front surfaces of side walls 70 and 71. The apertures in these two stripper fingers are adapted to register with the pins 64 and 65. The fingers 75 and 76 are adapted to fit in the recessed portions around pins 64 and 65, which recessed portion is shown in connection with pin 64 in FIGURE 3 and which have been already referred to. Extending between the two side walls 70 and 71 are a pair of film guide rollers 80 and 81. These film guide rollers are freely rotatable and have their center portions of smaller diameter so that only the outer portions of the rollers bear upon the film to avoid any possible damage to the central portion of the film carrying the images to be projected. These rollers are mounted in such a position and have a diameter such that the plane bounded by the outermost portions of the rollers passes in front of the stripper fingers 75 and 76 and immediately behind the front surface of side walls 70 and 71.

Hingedly secured to the front of the movable frame member 12 is an aperture plate 85 which is hingedly secured to the wall 70 in any suitable manner and is held closed by a suitable catch 86. The aperture plate has a central aperture 88 which coincides in cross sectional area to the portion of the film to be projected. The aperture plate 85 is normally maintained in closed position by a catch 86 and is swung open for the insertion of the film. As best shown in FIGURE 2, the aperture plate 85 is provided with a plurality of relatively small apertures 90 and 91 therethrough which apertures are aligned with and under certain conditions are adapted to receive the pins 64 and 65. The aperture plate 85, when in closed position, is spaced from the stripper fingers 75 and 76 by a distance slightly greater than the thickness of the film 22 so that the film when passing over rollers 80 and 81 passes freely between the stripper fingers and the aperture plate.

The frame member 12 is telescopically mounted with respect to the fixed frame member 11, the two side walls 70 and 71 sliding between the upper and lower sets of arms 57 and 59 and 58 and 60. At the same time, the two walls 70 and 71 of frame member 12 straddle the side arms of U-shaped member 62, as best shown in FIGURE 4. The movable frame member 12 is moved with respect to the fixed frame member 11 by a bell crank lever 46, best shown in FIGURE 2. This bell crank lever, as mentioned in connection with FIGURE 1, is positioned by a solenoid 47. The bell crank lever, as shown in FIGURE 2, is pivoted at 94 to the fixed frame member 11 and has an upstanding arm 95 pivoted through a suitable pin and slot connection to the movable frame member 12. The bell crank lever 46 is biased to the position shown by a spring 93 connected between the fixer frame member and the horizontal leg of the bell crank lever. Upon energization of the solenoid 47, the bell crank lever is rocked in a counterclockwise direction (as viewed in FIGURE 2) to move the movable frame member 12 inwardly. As will be discussed in more detail later, this has the effect of causing the locating pins 64 and 65 to pass through sprocket holes 23 and 24 to locate the position of the film accurately, when the film has been stopped at a predetermined portion which is to be viewed.

*Operation*

When the film is being driven, the parts are in the relative positions shown in FIGURES 2, 3, 4 and 6. As will be readily apparent from FIGURE 3, the film passes over the upper and lower sprocket wheels 13 and 14, being driven thereby due to the teeth of the sprocket wheels entering the sprocket holes 23 and 24, this action being conventional. It will be noted that the film does not pass in a straight line from sprocket wheel 13 to sprocket wheel 14. Instead, it passes over the guide rollers 80 and 81 which, as is evident from FIGURES 3 and 4, are substantially forward of the forward edge of the sprocket wheels 13 and 14. Thus, the rollers 80 and 81 push the film forwardly. The film, in this position, is clear of the teeth 64 and 65. The film in passing between the rollers 80 and 81 passes between the front aperture plate 85 and the stripper fingers 75 and 76. Under these conditions, the film can move freely at a very high rate, determined by the speed of motor 15 and the gearing between it and the sprocket wheels 13 and 14.

When the motor reaches the desired position determined by the position of the switching mechanism 41, the motor control 40 is effective to abruptly stop the motor. Braking means may be employed to facilitate this abrupt stop and if desired, suitable anticipation means may be provided to reduce the speed of the motor and the film prior to being stopped. At the same time that the motor is stopped, solenoid 47 is energized to rock the bell crank lever 46 in a counterclockwise direction to move frame member 12 inwardly with respect to frame member 11. Since rollers 80 and 81 are carried by frame member 12 and the sprocket wheels 13 and 14 are carried by stationary frame member 11, it will be obvious from a consideration of FIGURE 3, for example, that the inward movement of frame member 12 with respect to frame member 11 will withdraw the rollers 80 and 81 from the position shown in FIGURE 3 to one in which they exert no pressure on the film and are not in contact therewith. At the same time, the movement of frame member 12 to the left, as viewed in FIGURE 3, causes the aperture plate and the stripper fingers 75 and 76 to be moved towards the pins 65 and 64 to force the film over these pins. This results in the locating pins 64 and 65 passing through the apertures in the stripper fingers, through the adjacent sprocket holes of the film 22, and into the openings 90 and 91 of the aperture plate 85. The accuracy of the motor control 40 is sufficiently great that the film will be stopped with one of the sprocket holes 23 in the approximate path of pin 64 and one of the sprocket holes 24 in the approximate path of pin 65. It will be noted that these pins are tapered towards their outer end so that they can enter the film even though the film is slightly misaligned. As, has been pointed out, the rollers 80 and 81, when the frame members are in the position shown in FIGURE 3, exert a certain amount of pressure on the film 22. When, however, the frame member 12 is moved inwardly with respect to frame member 11, this pressure is removed by rollers 80 and 81 and a certain amount of slack is introduced into the film 22. This is best indicated by a comparison of FIGURES 6 and 7 in which FIGURE 6 shows the relative positions of the rollers 80 and 81 and film sprockets 13 and 14 when the elements are in the position shown in FIGURE 3, and FIGURE 7 shows the relative positions of rollers 80 and 81 and film sprockets 13 and 14 when frame member 12 is moved inwardly with respect to frame member 11 by action of solenoid 47. It will be readily evident from FIGURE 7 that the film has a fair amount of slack between the two sprockets 13 and 14 and that this permits some shifting of the position thereof to facilitate entry of pins 64 and 65 into the adjacent sprocket holes. It is this feature of introducing slack at this time to permit the locating members to better enter the sprocket holes that constitutes one of the significant features of my invention. By introducing this slack, it is possible for the pins 64 and 65 to very accurately position the particular frame of the film without damaging the film.

The pins 64 and 65, it will be noted, pass not only through the sprocket holes but also through the openings in stripper fingers 75 and 76 and into the openings 91 and 90 in the aperture plate 85. Thus the film is firmly held in position both vertically and horizontally.

Furthermore, it will be noted that the film under these conditions is held not only both vertically and horizontally but also against movement toward or away from the lens elements. The aperture plate 85 is brought inwardly against the film and the film is held firmly between the aperture plate 85 and the front portion of bracket member 62 carrying the pins 64 and 65. Due to the depressed portions in bracket 62 around pins 64 and 65, the aperture plate can be moved into engagement with the film because of the stripper fingers 75 and 76 entering these recessed portions with the outer surfaces of the stripper fingers flush with the outer surfaces of side walls 70 and 71.

When it is again desired to move the film to a new position, the solenoid 47 is de-energized so as to cause frame member 12 to move under the action of biasing spring 93 to the position shown in FIGURE 3. The stripper fingers 75 and 76 are effective during the movement to force the film off of the pin 64 and 65 to free the film for longitudinal movement.

*Conclusion*

It will be seen that I have provided a film positioning apparatus for use in projectors in which the film is rapidly driven to a preselected position and then stopped, which film positioning apparatus is capable of very accurately positioning the film in the desired viewing position without any damage to the film.

While I have shown a specific embodiment of my invention for purposes of illustration, it is to be understood that the invention is limited solely by the scope of the appended claims.

I claim as my invention:

1. In a strip film projector for film having periodically spaced apertures adjacent at least one of the longitudinal edges thereof,
    driving means having portions engaging said apertures for continuously driving the film,
    control means for selectively stopping said drive means to cause any particular portion of said film to be maintained in a position where it is projected,
    a film locating projecting member normally disposed out of the path of the film to permit free continuous movement thereof,
    and means effective to cause relative movement of said film and said film locating member to cause said film locating member to enter a predetermined one of said apertures in said film each time that said control means is operated to stop said driving means.

2. The projector of claim 1 in which there is additional means effective to positively move the film clear of said film locating member when said control means is operated to again start said driving means.

3. In a strip film projector for film having two rows of periodically spaced apertures adjacent each of the longitudinal edges thereof,
    driving means having portions engaging said apertures for continuously driving the film,
    control means for selectively stopping said drive means to cause any particular portion of said film to be maintained in a position where it is projected,
    a pair of film locating projecting members spaced so that one of said film locating members is adjacent each of said rows of apertures,
        said locating members normally being disposed out of the path of the film to permit free continuous movement thereof,
    and means effective to cause relative movement of said film and said film locating members to cause each of said film locating members to enter a predetermined one of said apertures in a different row of apertures in said film each time that said control means is operated to stop said driving means.

4. In a strip film projector for film having periodically spaced apertures adjacent at least one of the longitudinal edges thereof,
    driving means having portions engaging said apertures for continuously driving the film,
    guiding means normally engaging said film and exerting pressure thereon,
    control means for selectively stopping said drive means to cause any particular portion of said film to be maintained in a position where it is projected,
    a film locating projecting member normally disposed out of the path of the film to permit free continuous movement thereof,
    and means effective to cause relative movement of said film, said guiding means, and said film locating member to cause said film to be free of pressure from said guiding means and to cause said locating member to enter a predetermined one of said apertures in said film each time that said control means is operated to stop said driving means.

5. The combination of claim 4 in which said guiding means comprises at least one roller resiliently biased into engagement with the film.

6. The projector of claim 2 in which the guiding means is effective to positively move the film clear of said film locating projecting member when said control means is operated to again start said driving means.

7. In film positioning apparatus for strip film having periodically spaced sprocket apertures therein,
   a pair of relatively movable members,
       a first of said members having film sprockets thereon to drive the film and a film locating projecting member adapted to enter a sprocket aperture in the film when the latter is stopped at a desired location,
       a second of said members having an inner film guiding means and an outer aperture plate, the film being adapted to pass between said film guiding means and said aperture plate,
   means for normally maintaining said relatively movable members in a position in which said film guiding means urges the film away from said film locating member,
   and means effective when the longitudinal movement of the film is stopped to move said members relative to each other to shift the film guiding means and cause said aperture plate to force the film against the film locating member to cause the locating member to enter the sprocket aperture which is adjacent said film locating member when the film is stopped.

8. The apparatus of claim 7 in which the aperture plate is provided with an aperture therethrough, through which said locating member is adapted to extend after passing through the sprocket aperture of the film.

9. In film positioning apparatus for strip film having rows of periodically spaced sprocket apertures therein adjacent each longitudinal edge thereof,
   a pair of relatively movable members,
       a first of said members having film sprockets thereon to drive the film and film locating projecting members each adapted to enter one of said sprocket apertures in the film when the latter is stopped at a desired location,
       a second of said members having a pair of film guiding rollers,
   means for normally maintaining said relatively movable members in a position in which said film guiding rollers urge the film away from said film locating member,
   and means effective when the longitudinal movement of the film is stopped to move said members relative to each other to shift the film guiding rollers and cause the film locating members to enter the sprocket apertures which are adjacent said film locating members when the film is stopped.

References Cited by the Examiner

UNITED STATES PATENTS

| | | | |
|---|---|---|---|
| 2,017,855 | 10/1935 | Foster et al. | |
| 2,747,457 | 5/1956 | Wengel | 226—55 X |
| 3,225,991 | 12/1965 | Palmer | 226—56 |

M. HENSON WOOD, JR., *Primary Examiner.*

V. C. WILKS, *Assistant Examiner.*